US012730619B2

(12) United States Patent
Steele et al.

(10) Patent No.: US 12,730,619 B2
(45) Date of Patent: Sep. 8, 2026

(54) SOURCE CODE OPTIMIZATION

(71) Applicant: International Business Machines Corporation, Armonk, NY (US)

(72) Inventors: Tyler Steele, Edmonton (CA); Jordan Gillette, North York (CA); Reid Copeland, Ontario (CA); Muhammad Suhaib Tahir Saleem, Toronto (CA); Jacqueline Midroni, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 18/441,647

(22) Filed: Feb. 14, 2024

(65) Prior Publication Data

US 2026/0086786 A1 Mar. 26, 2026

(51) Int. Cl.

*G06F 8/41* (2018.01)
*G06F 8/72* (2018.01)

(52) U.S. Cl.

CPC .............. *G06F 8/447* (2013.01); *G06F 8/443* (2013.01); *G06F 8/72* (2013.01)

(58) Field of Classification Search

CPC . G06F 8/443; G06F 8/72; G06F 8/447; G06F 8/41

See application file for complete search history.

(56) References Cited

U.S. PATENT DOCUMENTS

| | | | |
|---|---|---|---|
| 7,231,633 | B2 | 6/2007 | Grassens |
| 8,015,554 | B2 | 9/2011 | Varma |
| 8,943,472 | B1 | 1/2015 | Ganelin |
| 9,213,541 | B2 | 12/2015 | Araya et al. |
| 9,411,581 | B2 | 8/2016 | Peled |
| 10,324,695 | B2 | 6/2019 | Champagne |
| 10,430,180 | B2 | 10/2019 | Kakhandiki et al. |
| 11,061,652 | B1 | 7/2021 | Biswas et al. |
| 11,074,047 | B2 | 7/2021 | Makkar |
| 11,093,240 | B2 | 8/2021 | Makkar |
| 2005/0138606 | A1 | 6/2005 | Basu et al. |

(Continued)

FOREIGN PATENT DOCUMENTS

| | | | | | |
|---|---|---|---|---|---|
| CA | 2949251 | C | | 5/2019 | |
| CN | 117008916 | A | * | 11/2023 | ............. G06F 8/443 |
| WO | WO-2021035553 | A1 | * | 3/2021 | ............. G06F 16/00 |

OTHER PUBLICATIONS

Murat Bolat; Source Code Partitioning in Program Optimization; IEEE; pp. 5663; retrieved on Mar. 30, 2026 (Year: 2011).*

(Continued)

*Primary Examiner* — S. Sough
*Assistant Examiner* — Cuong V Luu
(74) *Attorney, Agent, or Firm* — Yee & Associates, P.C.

(57) ABSTRACT

A computer implemented method optimizes source code. A processor set receives a source code in a first version. The processor set compiles the source code in the first version to generate an intermediate representation for the source codes in the first version. The processor set compares the intermediate representation for the source code in the first version to a number of optimization paths. The processor set identifies a number of matches based on the comparisons. The processor set updates at least a portion of the source code in the first version to the second version based on the number of matches to generate the source code in the second version.

20 Claims, 7 Drawing Sheets

(56) References Cited

U.S. PATENT DOCUMENTS

| | | | | |
|---|---|---|---|---|
| 2006/0155539 | A1 | 7/2006 | Chen et al. | |
| 2008/0222616 | A1 | 9/2008 | Cheng et al. | |
| 2013/0086565 | A1* | 4/2013 | Gaster | G06F 8/41 717/148 |
| 2020/0310768 | A1* | 10/2020 | Zhang | G06F 8/43 |
| 2023/0195727 | A1* | 6/2023 | Jain | G06F 16/24542 707/718 |

OTHER PUBLICATIONS

Dennis J. Frailey ; An Intermediate Language for Source and Target Independent Code Optimization; ACM; pp. 188-200; retrieved on Mar. 30, 2026 (Year: 1979).*

* cited by examiner

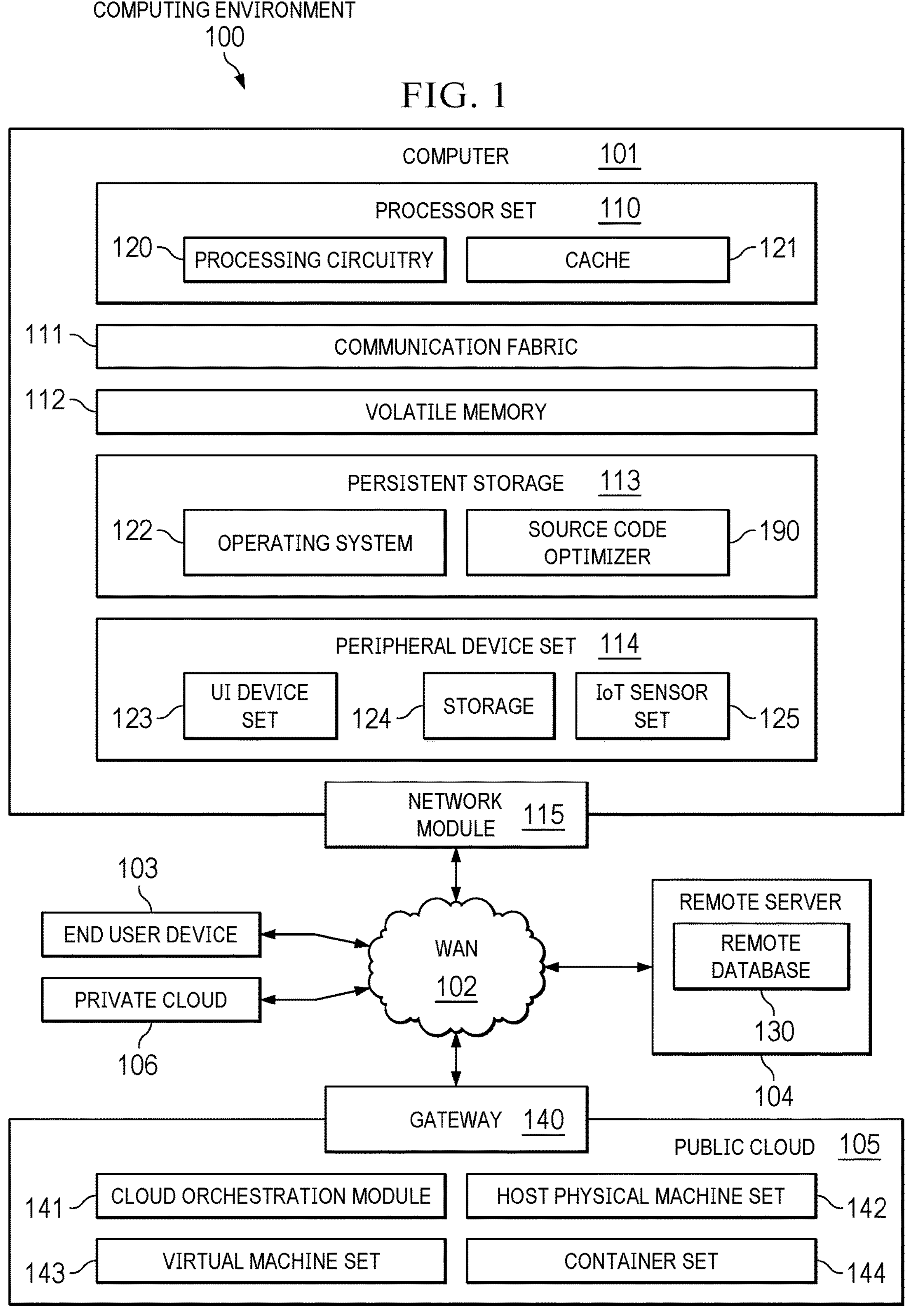
COMPUTING ENVIRONMENT
100
FIG. 1
COMPUTER 101
PROCESSOR SET 110
120
PROCESSING CIRCUITRY
CACHE
121
111
COMMUNICATION FABRIC
112
VOLATILE MEMORY
PERSISTENT STORAGE 113
122
OPERATING SYSTEM
SOURCE CODE OPTIMIZER
190
PERIPHERAL DEVICE SET 114
123
UI DEVICE SET
124
STORAGE
IoT SENSOR SET
125
NETWORK MODULE 115
103
END USER DEVICE
PRIVATE CLOUD
106
WAN
102
REMOTE SERVER
REMOTE DATABASE
130
104
GATEWAY 140
PUBLIC CLOUD 105
141
CLOUD ORCHESTRATION MODULE
HOST PHYSICAL MACHINE SET
142
143
VIRTUAL MACHINE SET
CONTAINER SET
144

SOURCE CODE OPTIMIZATION

BACKGROUND

The disclosure relates generally to source code optimization and more specifically to optimizing source code in different versions.

Source code refers to text written using a human-readable programming language and it is the raw form of a computer program before it gets transformed into machine code through compilation. Source code can include sets of statements, commands, and logic that produce executable machine code of a software application upon compilation. Source code is usually created using a text editor or an integrated development environment (IDE) and serves as the foundation for building software.

In other words, programmers develop source code to instruct computers on how to perform specific tasks. The crafted source code can include functions, classes, and control structures such as loops and conditionals. The clarity and coherence of source code are essential for individual programmers as well as collaborative efforts that facilitate teamwork between programmers.

SUMMARY

According to one illustrative embodiment, a computer-implemented method for optimizing source code is provided. A processor set receives a source code in a first version. The processor set compiles the source code in the first version to generate an intermediate representation for the source codes in the first version. The processor set compares the intermediate representation for the source code in the first version to a number of optimization paths. The processor set identifies a number of matches based on the comparisons. The processor set updates at least a portion of the source code in the first version to the second version based on the number of matches to generate the source code in the second version. According to other illustrative embodiments, a computer system, and a computer program product for optimizing source code are provided.

BRIEF DESCRIPTION OF THE DRAWINGS

FIG. 1 is an illustration of a block diagram of a computing environment in accordance with an illustrative embodiment;

DETAILED DESCRIPTION

Figure 2:
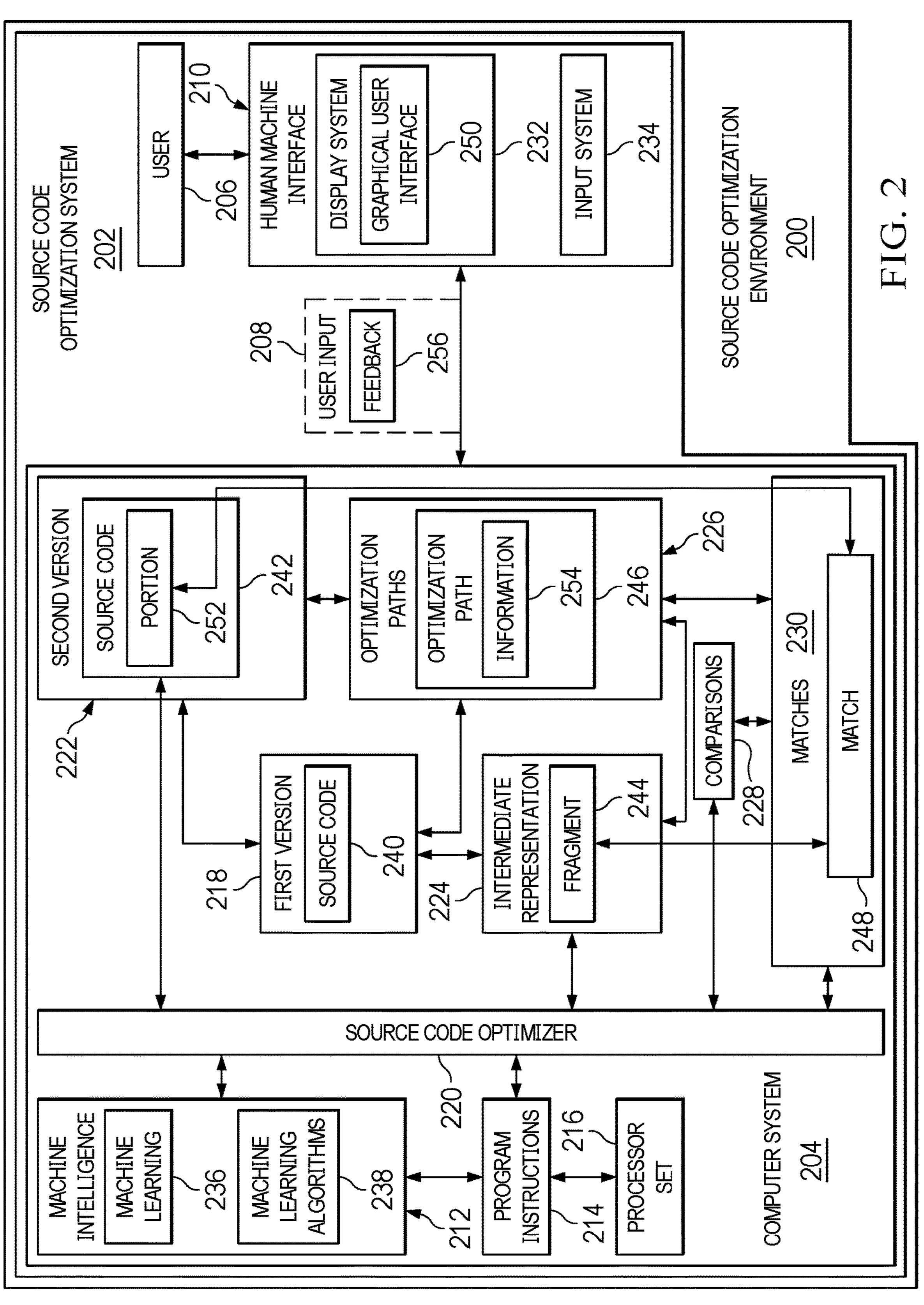
FIG. 2 is an illustration of a block diagram for a source code optimization environment in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more, storage media (also called "mediums") collectively included in a set of one or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, an illustration of a block diagram of a computing environment is depicted in accordance with an illustrative embodiment. Computing environment 100 contains an example of an environment for the execution of at least some of the computer code involved in performing the inventive methods, such as source code optimizer 190. In addition to source code optimizer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and source code optimizer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in source code optimizer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in source code optimizer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage such as an external hard drive, or insertable storage such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display or otherwise present the recommendation to an end user. In some embodiments, EUD 103 may be a client device, such as a thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private cloud 106 and public cloud 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account a number of different considerations as described herein. For example, the illustrative embodiments recognize and take into account that many compilers developed by companies have frequent updates that provide new features and optimizations with each release version.

The illustrative embodiments recognize and take into account that source code migration from one version to another version presents significant challenges because programmers need to identify code features that are no longer supported or changed syntax and code features or structures that can benefit from the new features provided by the newer version. Such a process is labor intensive and requires numerous computational powers.

Thus, illustrative embodiments provide a computer implemented method, apparatus, system, and computer program product for optimizing source code. A processor set receives source code in a first version. The processor set compiles the source code in the first version to generate an intermediate representation for the source codes in the first version. The processor set compares the intermediate representation for the source code in the first version to a number of optimization paths. The processor set identifies a number of matches based on the comparisons. The processor set updates at least a portion of the source code in the first version to the second version based on the number of matches to generate the source code in the second version. According to other illustrative embodiments, a computer system, and a computer program product for optimizing source code are provided.

With reference now to FIG. 2, an illustration of a block diagram of a source code optimization environment is depicted in accordance with an illustrative embodiment. In this illustrative example, source code optimization environment 200 includes components that can be implemented in hardware such as the hardware shown in computing environment 100 in FIG. 1.

In this illustrative example, source code optimization system 202 in source code optimization environment 200 optimizes source code in different versions to improve efficiency and functionality for source code. In this illustrative example, source code optimization system 202 includes computer system 204 and source code optimizer 220. Source code optimizer 220 is located in computer system 204. Source code optimizer 220 may be implemented using source code optimizer 190 in FIG. 1.

Source code optimizer 220 can be implemented in software, hardware, firmware, or a combination thereof. When software is used, the operations performed by source code optimizer 220 can be implemented in program instructions configured to run on hardware, such as a processor unit. When firmware is used, the operations performed by source code optimizer 220 can be implemented in program instructions and data and stored in persistent memory to run on a processor unit. When hardware is employed, the hardware can include circuits that operate to perform the operations in source code optimizer 220.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

As used herein, when used with reference to items, "a set of" means one or more of the items. For example, "a set of clouds" is one or more different types of cloud environments.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes source code 240 in first version 218. First version 218 can be an existing version or a previous version for source code 240 that provides a set of functionalities. In this illustrative example, source code 240 in first version 218 can be converted to intermediate representation 224. Intermediate representation 224 serves as a standardized and structured representation of a program's logic and structure for source code 240. Intermediate representation 224 is an intermediate form between source code 240, which is written by programmers and machine code that computers execute. Intermediate representation 224 can be analyzed for optimization of source code 240 in first version 218 before execution.

Intermediate representation 224 includes a number of fragments that represent a portion of code in source code 240. In this illustrative example, intermediate representation 224 can be in form of abstract syntax trees (ASTs), three-address code (TAC), static single assignment (SSA), or any suitable forms to represent source code.

In this illustrative example, source code optimizer 220 compares intermediate representation 224 for source code 240 in first version 218 to optimization paths 226. Optimization paths 226 are data structures that include information for converting source code 240 in first version 218 to second version 222. In other words, source code optimizer 220 can use optimization paths 226 to identify portions in source code 240 in first version 218 to be upgraded to second version 222 for improvement in efficiency and functionality. Optimization paths 226 can be tables, arrays, lists, matrices, graphs, or any suitable data structures. In this illustrative example, source code optimizer 220 generates comparisons 228 by comparing source code 240 in first version 218 to optimization paths 226.

Source code optimizer 220 produces matches 230 based on comparisons 228 between intermediate representation 224 and optimization paths 226. In this illustrative example, each match in matches 230 includes a fragment from intermediate representation 224 and corresponding portion of source code 240 for the fragment of the intermediate representation 224 in the second version 222 based on an optimization path from optimization paths 226. In other words, each match in matches 230 identifies a portion of source code 240 in first version 218 that can be converted to second version 222. In this illustrative example, intermediate representation 224 and optimization paths 226 can be in the same syntax specified by a complier vendor.

In this illustrative example, a portion in source code 240 in first version 218 can be matched to several optimization paths in optimization paths 226, which means that the portion in source code 240 can be updated to second version 222 to improve efficiency and functionality in a number of different ways. In an alternative example, optimization paths in optimization paths 226 can be organized in a hierarchical structure and stored in an optimization path library such that identification of optimization paths for fragments in intermediate representation 224 becomes easier.

For example, match 248 in matches 230 can be a match for fragment 244 that corresponds to a portion of source code 240 in first version 218 and portion 252 that corresponds to the portion of source code 240 in second version 222. In this illustrative example, match 248 can be generated based on optimization path 246 that includes information 254. As depicted, information 254 contains information for converting the portion of source code 240 in first version 218 that corresponds to fragment 244 to portion 252 in second version 222.

Source code optimizer 220 can update source code 240 based on portion 252 and generates source code 242 in second version 222. In other words, source code optimizer 220 can use match 248 for converting the portion of source code 240 in first version 218 to correspond to code in the portion of source code 242 in second version 222 to produce an updated version of source code 240.

Computer system 204 further includes machine intelligence 212. Machine intelligence 212 includes machine learning 236 and machine learning algorithms 238. Machine learning 236 is a branch of artificial intelligence (AI) that enables computers to detect patterns and improve performance without direct programming commands. Rather than relying on direct input commands to complete a task, machine learning 236 relies on input data. The data is fed into the machine, one of machine learning algorithms 238 is selected, parameters for the data are configured, and the machine is instructed to find patterns in the input data through optimization algorithms. The data model formed from analyzing the data is then used to predict future values. In this illustrative example, the learning of the source code optimizer 220 can be achieved through a database input that is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching for the source code optimizer 220.

In addition, machine intelligence 212 can also include deep learning and deep learning algorithms. Deep learning is a method of artificial intelligence that mimics the human brain's capacity to learn and adapt. Deep learning utilizes neural networks that have multiple layers for identifying and learning features from data. In this illustrative example, deep learning can use an iterative process such as backpropagation and gradient descent to refine its parameters to make accurate predictions by minimizing the difference between outputs and actual results.

In this illustrative example, machine intelligence 212 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 212.

Machine intelligence 212 can be implemented using one or more systems such as an artificial intelligence system, a neural network, a generative neural network, a Bayesian network, an expert system, a fuzzy logic system, a genetic algorithm, or other suitable types of systems. Machine learning 236 and machine learning algorithms 238 may make computer system 204 a special purpose computer for optimizing source code.

Machine learning 236 involves using machine learning algorithms 238 to build machine intelligence 212 based on samples of data. The samples of data used for training are referred to as training data or training datasets. As depicted, machine intelligence 212 can be trained using historical updates on source code. Machine intelligence 212 can make predictions without being explicitly programmed to make these predictions and can be trained and retrained for a number of different types of applications. These applications include, for example, medicine, financial services, healthcare, speech recognition, computer vision, or other types of applications.

Machine learning algorithms 238 can include supervised machine learning algorithms, unsupervised machine learning algorithms, and self-learning algorithms. Supervised machine learning can train machine learning models using data containing both the inputs and desired outputs. Examples of machine learning algorithms include XGBoost, K-means clustering, and random forest.

In an alternative example, updating source code 240 can also be performed manually. For example, computer system 204 can receive a user input 208 from user 206. In this example, user input 208 can be generated by user 206 using human machine interface (HMI) 210. As depicted, human machine interface 210 includes display system 232 and input system 234. Display system 232 is a physical hardware system and includes one or more display devices on which graphical user interface 250 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 250 through user input 208 generated by input system 234. Input system 234 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In one illustrative example, computer system 204 can receive commands in user input 208 for performing reviews and updates for source code 240. For example, portions of source code 240 in first version 218 can be tagged and displayed on graphical user interface 250 based on matches 230 for user 206 to manually review and update source code 240. In this illustrative example, user 206 can select a subset in portions of source code 240 in first version 218 such that not all tagged code in source code 240 is updated. Such manual review can result in at least a portion of source code 240 to be updated to second version.

In this example, user 206 can also review matches 230 to determine accuracy of updating source code 240 in first version 218. For example, user 206 can review matches 230 to determine whether updating source code 240 based on matches 230 can lead to improvement in functionality and efficiency. After reviewing, user 206 can provide feedback 256 through user input 208 to source code optimizer 220.

Source code optimizer 220 can use feedback 256 to perform retraining to improve machine intelligence 212. In this illustrative example, machine learning algorithms 238 in machine intelligence 212 can use feedback from feedback 256 in user input 208 received from user 206 to retrain machine intelligence 212 such that accuracy and quality of matches 230 identified by source code optimizer 220 can be improved over time.

In one illustrative example, one or more solutions are present that overcome a problem with optimizing source code. As a result, one or more technical solutions may provide an ability to increase efficiency and accuracy in optimizing source code. Thus, the inconveniences and errors from manually updating source code in different versions can be reduced.

In the illustrative example, computer system 204 can be configured to perform at least one of the steps, operations, or actions described in the different illustrative examples using software, hardware, firmware, or a combination thereof. As a result, computer system 204 operates as a special purpose computer system in which source code optimizer 220 in computer system 204 enables managing the execution of training machine intelligence 212, generating matches 230, and automatically updating source code in one version to another version. In particular, source code optimizer 220 transforms computer system 204 into a special purpose computer system as compared to currently available general computer systems that do not have source code optimizer 220.

In the illustrative example, the use of source code optimizer 220 in computer system 204 integrates processes into a practical application for optimizing source code that increases the performance of computer system 204. In other words, source code optimizer 220 in computer system 204 is directed to a practical application of processes integrated into source code optimizer 220 in computer system 204 that optimize source codes in different versions such that efficiency and functionality for software and hardware in computer system 204 are improved.

The illustration of source code optimization environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
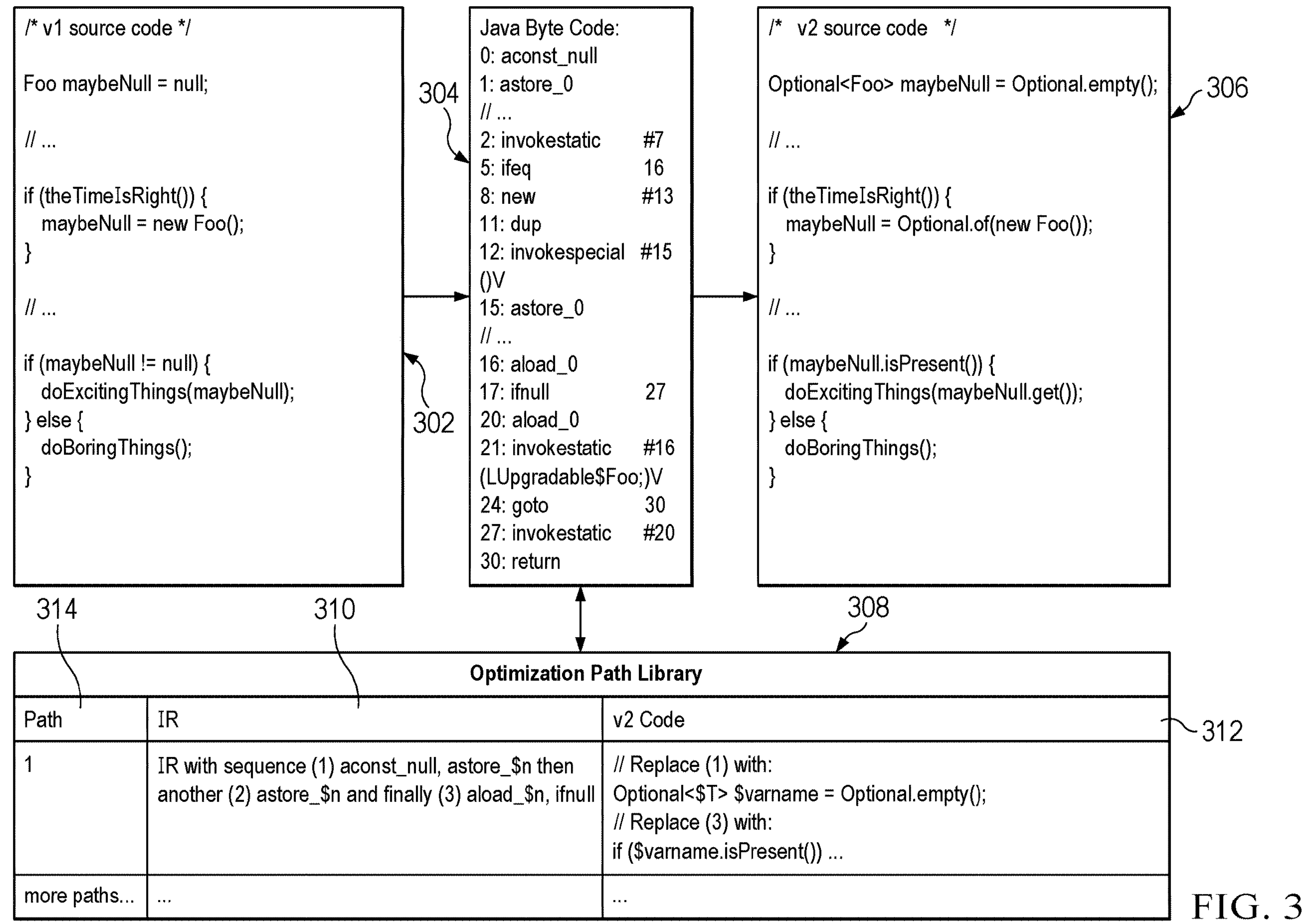
FIG. 3 is an illustration for optimizing source codes from one version to another version in accordance with an illustrative embodiment.

Turning now to FIG. 3, a diagram for optimizing source codes from one version to another version is depicted in accordance with an illustrative embodiment. In this illustrative example, the conversion of source code from one version to another version shown in FIG. 3 can be performed by source code optimizer 220 in computer system 204 in FIG. 2.

In FIG. 3, source code 302 is an exemplary source code in an existing version. In this illustrative example, source code 302 can be an example of source code 240 in first version 218 in FIG. 2. As depicted, source code 302 is Java code.

In this illustrative example, intermediate representation 304 is generated for source code 302. intermediate representation 304 can be an example of intermediate representation 224 in FIG. 2. As depicted, intermediate representation 304 is the form of Java Byte Code.

Intermediate representation 304 is then compared to optimization paths in optimization path library 308. In this illustrative example, optimization paths in optimization path library 308 can be examples of optimization paths 226 in FIG. 2. In optimization path library 308, column 310 represents fragments of intermediate representations and column 312 represents portions of source code in another version and rules for converting source code corresponding to fragments of intermediate representations in column 310.

In this illustrative example, optimization path library 308 can define meta-language that allows meta-variables such as "n" used in column 310 for intermediate representations. In this example, standard techniques can be used to track whether the position of "n" refers to the same position on the abstract machine's stack. Similarly, optimization path library 308 can also provide the ability to populate "varname" and "T" from original source code using static analysis techniques.

For example, optimization path 314 is identified for intermediate representation 304 such that a portion of source code 302 can be updated to another version for improved efficiency and functionality. In this example, Java introduced the "Optional" class to enable programming with Option types. This object provides a set of methods to determine if a variable is assigned or unassigned, for accessing the object the variable is assigned to, and for interrupting control flow if the object is accessed when it is unassigned. Before this change, developers often declared a variable and initialized it to null. Later they assigned a value, and a null check was performed before each access.

As depicted, optimization path 314 indicates that corresponding codes of source code 302 for lines 2, 3, 15, 16, and 17 of intermediate representation 304 can be updated to another version for improved functionality and efficiency. As a result, source code 306 is generated based on optimization path 314. In this illustrative example, source code 306 can be an example of source code 242 in second version 222 in FIG. 2.

The illustration of optimizing source code shown in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, other programming languages, and forms of intermediate representations can be used for optimizing source codes. In yet another example, other data structures can be used for optimization path library 308 too.

Figure 4:
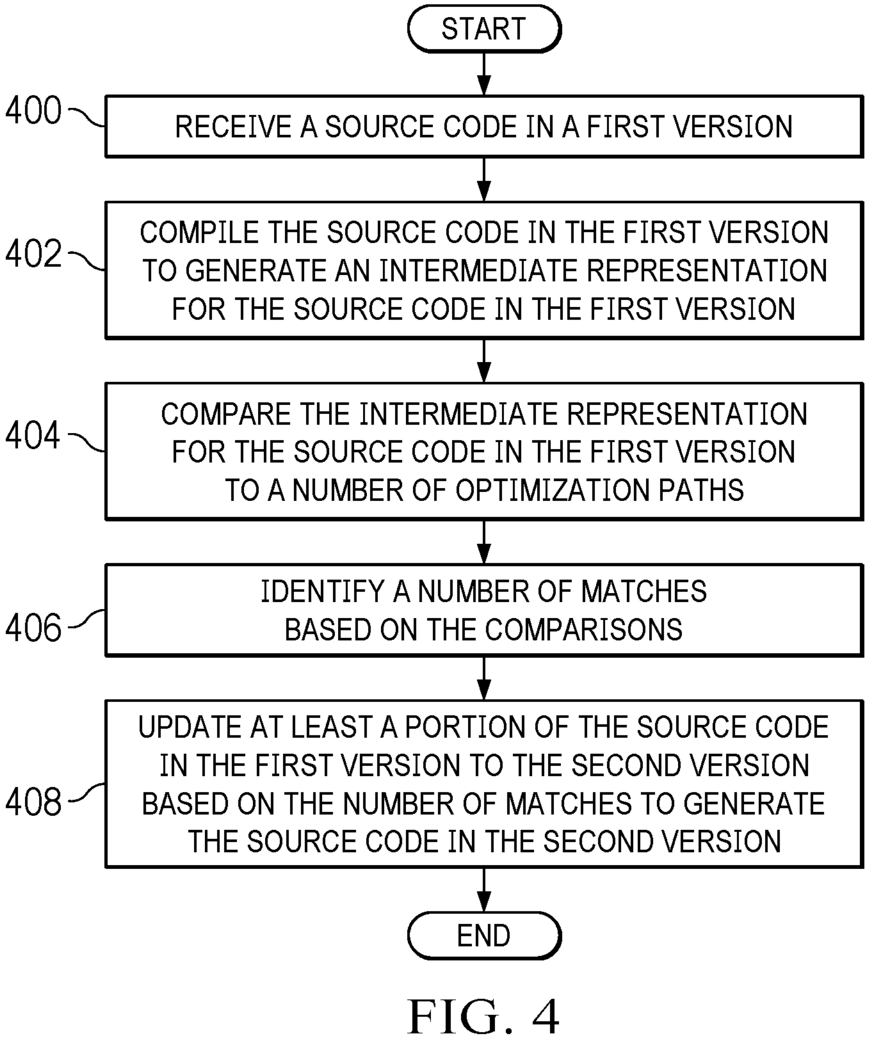
FIG. 4 is a flowchart of a process for optimizing source code in accordance with an illustrative embodiment.

Turning now to FIG. 4, a flowchart of a process for optimizing source code is depicted in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in source code optimizer 220 in computer system 204 in FIG. 2.

The process begins by receiving a source code in a first version (step 400). The process compiles the source code in the first version to generate an intermediate representation for the source codes in the first version (step 402). The process compares the intermediate representation for the source code in the first version to a number of optimization paths (step 404). In step 404, the number of optimization paths are data structures that comprise information for converting the source code in the first version to a second version.

The process identifies a number of matches based on the comparisons, (step 406). In step 406, each match from the number of matches comprises a fragment of the intermediate representation and corresponding portion of the source code for the fragment of the intermediate representation in the second version based on an optimization path from number of optimization paths.

The process updates at least a portion of the source code in the first version to the second version based on the number of matches to generate the source code in the second version (step 408). The process terminates thereafter.

Figure 5:
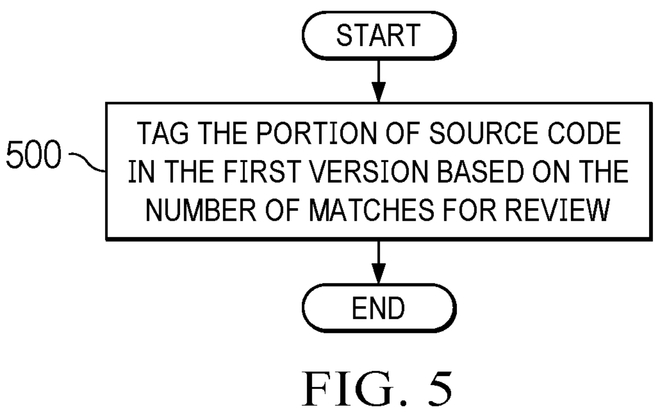
FIG. 5 is a flowchart of a process for tagging source code for review in accordance with an illustrative embodiment.

Turning next to FIG. 5, a flowchart of a process for tagging source code for review is depicted in accordance with an illustrative embodiment. The process in this figure is an example of an additional step that can be performed with the steps in FIG. 4.

The process begins by tagging the portion of the source code in the first version based on the number of matches for review (step 500). The process terminates thereafter.

Figure 6:
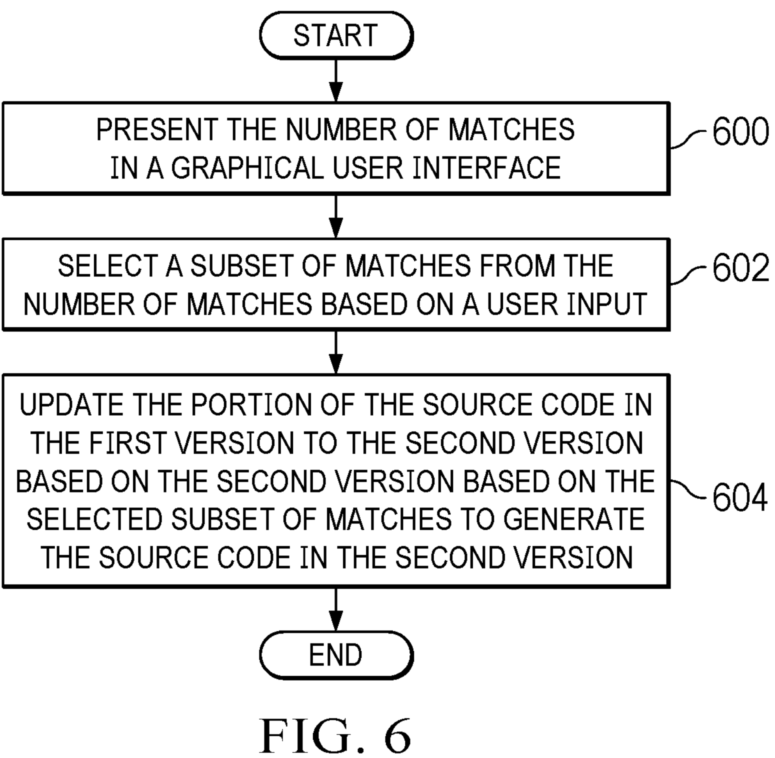
FIG. 6 is a flowchart of a process for optimizing source code in accordance with an illustrative embodiment.

Turning next to FIG. 6, a flowchart of a process for optimizing source code is depicted in accordance with an illustrative embodiment. The process in this flowchart is an example of an implementation for step 408 in FIG. 4.

The process begins by presenting the number of matches in a graphical user interface (step 600). The process selects a subset of matches from the number of matches based on a user input (step 602). The process updates the portion of the source code in the first version to the second version based on the selected subset of matches to generate the source code in the second version (step 604). The process terminates thereafter.

Figure 7:
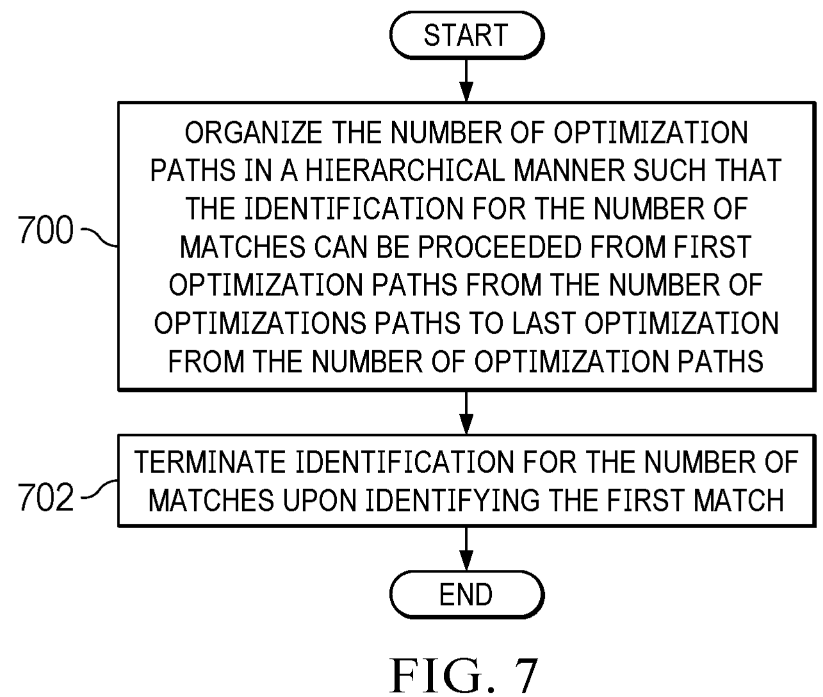
FIG. 7 is a flowchart of a process for identifying matches for intermediate representation for the source code in accordance with an illustrative embodiment.

Turning next to FIG. 7, a flowchart of a process for identifying matches for intermediate representation for the source code is depicted in accordance with an illustrative embodiment. The process in this flowchart is an example of an implementation for step 406 in FIG. 4.

The process begins by organizing the number of optimization paths in a hierarchical manner such that the identification for the number of matches can be proceeded from first optimization paths from the number of optimizations paths to last optimization from the number of optimization paths (step 700). The process terminates identification for the number of matches upon identifying the first match (step 702). The process terminates thereafter.

Figure 8:
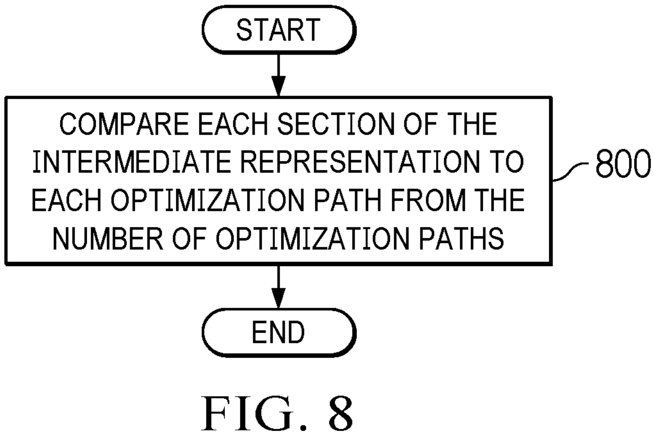
FIG. 8 is a flowchart of a process for comparing the intermediate representation for the source code to optimization paths in accordance with an illustrative embodiment.

Turning next to FIG. 8, a flowchart of a process for comparing the intermediate representation for the source code to optimization paths is depicted in accordance with an illustrative embodiment. The process in this flowchart is an example of an implementation for step 404 in FIG. 4.

The process begins by comparing each section of the intermediate representation to each optimization path from the number of optimization paths. (step 800). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
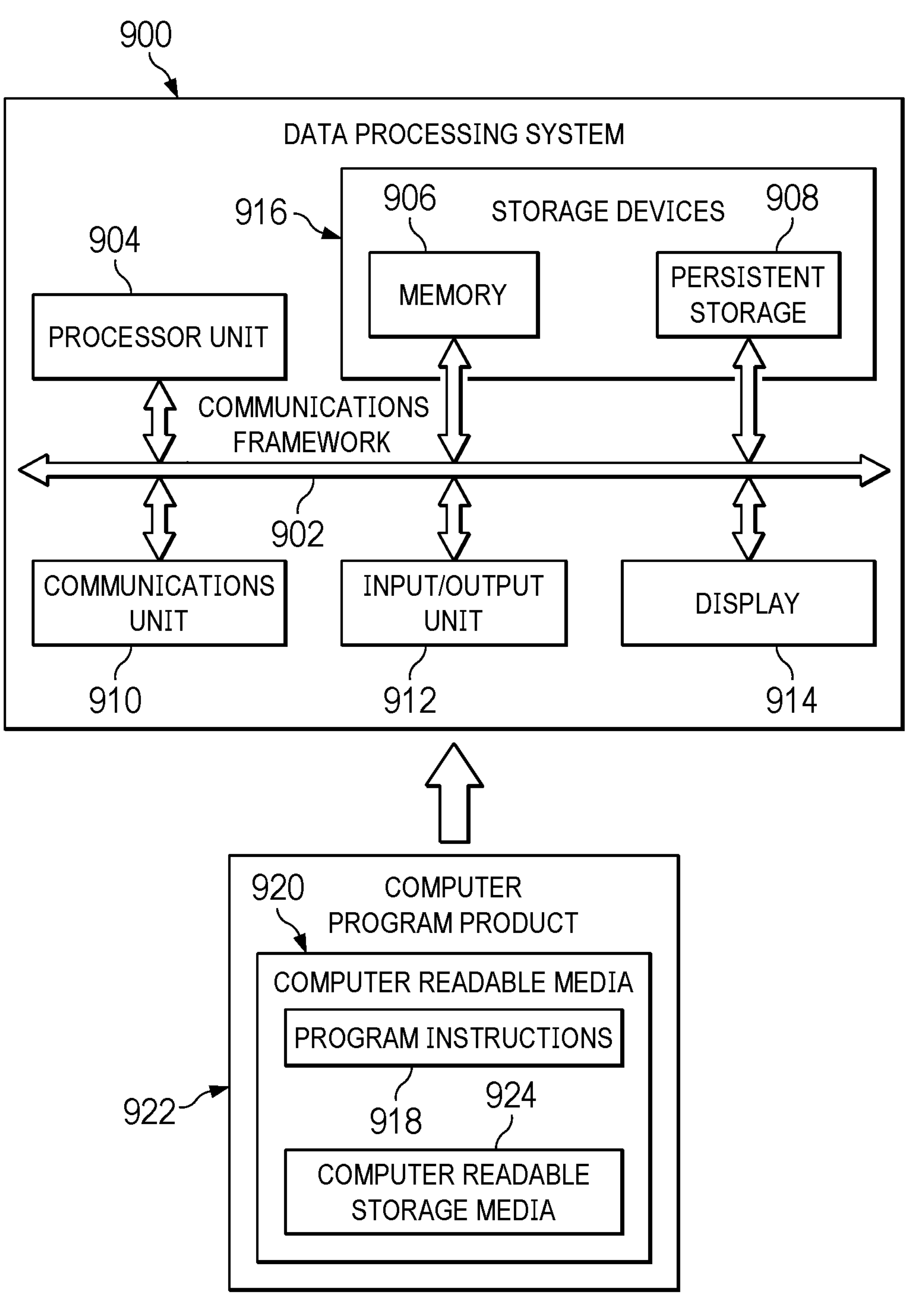
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement computers and computing devices in computing environment 100 in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 1004 through communications framework 902. The processes of the different embodiments can be performed by processor unit 904 using computer-implemented instructions, which may be located in a memory, such as memory 906.

These instructions are referred to as program instructions, computer usable program instructions, or computer-readable program instructions that can be read and executed by a processor in processor unit 904. The program instructions in the different embodiments can be embodied on different physical or computer-readable storage media, such as memory 906 or persistent storage 908.

Program instructions 918 are located in a functional form on computer readable media 920 that is selectively removable and can be loaded onto or transferred to data processing system 900 for execution by processor unit 904. Program instructions 918 and computer readable media 920 form computer program product 922 in these illustrative examples. In the illustrative example, computer readable media 920 is computer readable storage media 924.

Computer readable storage media 924 is a physical or tangible storage device used to store program instructions 918 rather than a medium that propagates or transmits program instructions 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 918 can be transferred to data processing system 900 using a computer-readable signal media. The computer-readable signal media are signals and can be, for example, a propagated data signal containing program instructions 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 920" can be singular or plural. For example, program instructions 918 can be located in computer readable media 920 in the form of a single storage device or system. In another example, program instructions 918 can be located in computer readable media 920 that is distributed in multiple data processing systems. In other words, some instructions in program instructions 918 can be located in one data processing system while other instructions in program instructions 918 can be located in one data processing system. For example, a portion of program instructions 918 can be located in computer readable media 920 in a server computer while another portion of program instructions 918 can be located in computer readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program instructions 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for optimizing source code, the computer implemented method comprising:

receiving, by a processor set, a source code in a first version;

compiling, by the processor set, the source code in the first version to generate an intermediate representation for the source code in the first version;

comparing, by the processor set, the intermediate representation for the source code in the first version to a number of optimization paths, wherein the number of optimization paths are data structures that comprise information for converting the source code in the first version to the source code in a second version, and wherein the number of optimization paths are stored as mappings between fragments of the intermediate representation and corresponding portions of the source code in the second version of the source code in an optimization path library;

identifying, by the processor set, a number of matches based on the comparisons, wherein each match from the number of matches comprises a fragment of the intermediate representation and corresponding portion of the source code in the second version for the fragment of the intermediate representation based on an optimization path from the number of optimization paths stored in the optimization path library; and updating, by the processor set, at least a portion of the source code in the first version to the second version based on the number of matches to generate the source code in the second version.

2. The computer implemented method of claim 1 further comprising:

tagging, by the processor set, the portion of the source code in the first version based on the number of matches for review.

3. The computer implemented method of claim 1, wherein the updating, by the processor set, the at least the portion of the source code in the first version to the second version based on the number of matches to generate the source code in the second version comprises:

presenting, by the processor set, the number of matches in a graphical user interface;

selecting, by the processor set based on a user input, a subset of matches from the number of matches; and updating, by the processor set, the at least the portion of the source code in the first version to the second version based on the selected subset of matches to generate the source code in the second version.

4. The computer implemented method of claim 1, wherein the identifying, by the processor set, the number of matches based on the comparisons comprises:

organizing, by the processor set, the number of optimization paths in a hierarchical manner such that the identification for the number of matches is proceeded from first optimization paths from the number of optimization paths to a last optimization from the number of optimization paths; and terminating, by the processor set, the identification for the number of matches upon identifying a first match.

5. The computer implemented method of claim 1, wherein the comparing, by the processor set, the intermediate representation for the source code in the first version to the number of optimization paths comprises:

comparing, by the processor set, each section of the intermediate representation to each optimization path from the number of optimization paths.

6. The computer implemented method of claim 1, wherein the intermediate representation and the number of optimization paths are in the same syntax specified by a complier vendor.

7. The computer implemented method of claim 1, wherein the intermediate representation excludes information related to variable names in the source code in the first version.

8. A computer system comprising:

a processor set;

a set of one or more computer-readable storage media; and program instructions, collectively stored in the set of one or more computer-readable storage media, for causing the processor set to:

receive a source code in a first version;

compile the source code in the first version to generate an intermediate representation for the source code in the first version;

compare the intermediate representation for the source code in the first version to a number of optimization paths, wherein the number of optimization paths are data structures that comprise information for converting the source code in the first version to the source code in a second version, and wherein the number of optimization paths are stored as mappings between fragments of the intermediate representation and corresponding portions of the source code in the second version of the source code in an optimization path library;

identify a number of matches based on the comparisons, wherein each match from the number of matches comprises a fragment of the intermediate representation and corresponding portion of the source code in the second version for the fragment of the intermediate representation based on an optimization path from the number of optimization paths stored in the optimization path library; and update at least a portion of the source code in the first version to the second version based on the number of matches to generate the source code in the second version.

9. The computer system of claim 8, wherein the program instructions, collectively stored in the set of one or more storage media, cause the processor set to:

tag the portion of the source code in the first version based on the number of matches for review.

10. The computer system of claim 8, wherein as part of the updating the at least the portion of the source code in the first version to the second version based on the number of matches to generate the source code in the second version, the program instructions, collectively stored in the set of one or more storage media, cause the processor set to:

present the number of matches in a graphical user interface;

select a subset of matches from the number of matches based on a user input; and update the at least the portion of the source code in the first version to the second version based on the selected subset of matches to generate the source code in the second version.

11. The computer system of claim 8, wherein as part of the identifying the number of matches based on the comparisons, the program instructions, collectively stored in the set of one or more storage media, cause the processor set to:

organize the number of optimization paths in a hierarchical manner such that the identification for the number of matches is proceeded from first optimization paths from the number of optimization paths to a last optimization from the number of optimization paths;

and terminate the identification for the number of matches upon identifying a first match.

12. The computer system of claim 8, wherein the comparing the intermediate representation for the source code in the first version to the number of optimization paths, the program instructions, collectively stored in the set of one or more storage media, cause the processor set to:

compare each section of the intermediate representation to each optimization path from the number of optimization paths.

13. The computer system of claim 8, wherein the intermediate representation and the number of optimization paths are in the same syntax specified by a complier vendor.

14. The computer system of claim 8, wherein the intermediate representation excludes information related to variable names in the source code in the first version.

15. A computer program product for optimizing source code, the computer program product comprising:

a set of one or more computer-readable storage media; and program instructions, collectively stored in the set of one or more computer-readable storage media, for causing a processor set to:

receive source code in a first version;

compile the source code in the first version to generate an intermediate representation for the source code in the first version;

compare the intermediate representation for the source code in the first version to a number of optimization paths, wherein the number of optimization paths are data structures that comprise information for converting the source code in the first version to the source code in a second version, and wherein the number of optimization paths are stored as mappings between fragments of the intermediate representation and corresponding portions of the source code in the second version of the source code in an optimization path library;

identify a number of matches based on the comparisons, wherein each match from the number of matches comprises a fragment of the intermediate representation and corresponding portion of the source code in the second version for the fragment of the intermediate representation based on an optimization path from the number of optimization paths stored in the optimization path library; and update at least a portion of the source code in the first version to the second version based on the number of matches to generate the source code in the second version.

16. The computer program product of claim 15, wherein program instructions, collectively stored in the set of one or more storage media further cause the processor set to:

tag the portion of the source code in the first version based on the number of matches for review.

17. The computer program product of claim 15, wherein as part of the updating the at least the portion of the source code in the first version to the second version based on the number of matches to generate the source code in the second version, the program instructions cause the processors set to:

present the number of matches in a graphical user interface;

select a subset of matches from the number of matches based on a user input; and update the at least the portion of the source code in the first version to the second version based on the selected subset of matches to generate the source code in the second version.

18. The computer program product of claim 15, wherein as part of the identifying the number of matches based on the comparisons, the program instructions cause the processors set to:

organize the number of optimization paths in a hierarchical manner such that the identification for the number of matches is proceeded from first optimization paths from the number of optimization paths to a last optimization from the number of optimization paths; and terminate the identification for the number of matches upon identifying a first match.

19. The computer program product of claim 15, wherein the comparing the intermediate representation for the source code in the first version to the number of optimization paths, the program instructions cause the processors set to:

compare each section of the intermediate representation to each optimization path from the number of optimization paths.

20. The computer program product of claim 15, wherein the intermediate representation and the number of optimization paths are in the same syntax specified by a complier vendor.

* * * * *